United States Patent
Tseng et al.

(10) Patent No.: US 8,165,200 B2
(45) Date of Patent: Apr. 24, 2012

(54) IMAGE PROCESSING APPARATUS AND IMAGE PROCESSING METHOD

(75) Inventors: Cheng-Te Tseng, Taipei (TW);
Tson-Yee Lin, Taipei (TW);
Chang-Hung Lee, Dounan Township, Yunlin County (TW)

(73) Assignee: Qiada Corporation, Taoyuan County (TW)

( * ) Notice: Subject to any disclaimer, the term of this patent is extended or adjusted under 35 U.S.C. 154(b) by 380 days.

(21) Appl. No.: 12/541,638

(22) Filed: Aug. 14, 2009

(65) Prior Publication Data
US 2010/0046607 A1    Feb. 25, 2010

(30) Foreign Application Priority Data
Aug. 20, 2008  (TW) ............................... 97131703 A (51) Int. Cl.
*H04B 1/66* (2006.01)
(52) U.S. Cl. ................ 375/240.01; 375/240.02; 725/41; 725/91; 725/103; 725/114; 725/115; 725/118; 382/232; 382/305; 382/307
(58) Field of Classification Search ............ 375/240.01, 375/240.02; 725/41, 91, 103, 114, 115, 118; 382/232, 305, 307
See application file for complete search history.

(56) References Cited

U.S. PATENT DOCUMENTS

| | | | |
|---|---|---|---|
| 6,172,672 B1 * | 1/2001 | Ramasubramanian et al. | 715/720 |
| 6,779,040 B1 * | 8/2004 | Lee et al. | 709/247 |
| 2005/0210515 A1 | 9/2005 | Roh | |

FOREIGN PATENT DOCUMENTS
CN    1674676 A    9/2005

* cited by examiner

*Primary Examiner* — Shawn An (57) ABSTRACT

The invention discloses an image processing apparatus and an image processing method. A server can transmit a first image and a second image. In an embodiment, the apparatus includes a receiving/transmitting unit, a processing unit and a display unit. The receiving/transmitting unit can communicate with the server to receive the first image and the second image. The processing unit is coupled to the receiving/transmitting unit and the display unit. The processing unit is for selectively recompressing the first image at a first compression ratio and then controlling the display unit to display the first image. In addition, the processing unit transmits the selected first compression ratio to the server such that the server compresses the second image at the first compression ratio and transmits it to the receiving/transmitting unit.

5 Claims, 7 Drawing Sheets

IMAGE PROCESSING APPARATUS AND IMAGE PROCESSING METHOD

BACKGROUND OF THE INVENTION

1. Field of the Invention

The present invention relates generally to an image processing apparatus and an image processing method, and more particularly, the present invention relates to an image processing apparatus and an image processing method for adjusting the image compressing ratio transmitted from a server to suit clients' requirement or their browse modes.

2. Description of the Prior Art

As the promotion of LCD technique recently, electronic apparatus provided with display units are broadly manufactured. Moreover, those products also tend to be provided with wire or wireless internet functions. Users could connect to the network server by means of electronic products to browse internet albums, real-time news, map or emails, etc.

A conventional server thereof would define specific transmission modes, and the client would have a net browser. When the server transmits the information with the defined mode to the client, the client's net browser would reset the information and resent it. Because different servers have different transmission modes, and the client's net browser could only support specific modes. In case some information can not be presented, a concept of processing all of the information to an image and then transmitting it to the client has formed. Thus, this concept reduces the complications of the programming of a client's net browser.

However, the file size of an image is somewhat larger; moreover, there is a limitation of the bandwidth of network or the network is sometimes busy. In order to avoid the delay and promote the transmission efficiency, the server usually compresses the image before transmission. The image compressed at a lower compression ratio usually has a larger file size and a clearer frame but a longer transmission time is needed; the image compressed at a higher compression ratio has a smaller file size and a quicker transmission rate but the frame is blurred. Additionally, the compression extent of an image and the color which could be presented on the client's display panel will be different. Therefore, how to determine an optimized compression ratio is a problem required to be solved.

Accordingly, the main aspect of the present invention is to provide an image processing apparatus and an image processing method to solve the problems mentioned above.

SUMMARY OF THE INVENTION

An aspect of the invention is to provide an image processing apparatus for communicating with a server. The server is capable of transmitting a first image and a second image, and the server compresses the first image at an initial compression ratio in advance.

According to an embodiment of the invention, the image processing apparatus includes a display unit, a receiving/transmitting unit and a processing unit. The receiving/transmitting unit is capable of communicating with the server so as to receive the first image and the second image. The processing unit is coupled to the receiving/transmitting unit and the display unit, for selectively compressing the first image at a first compression ratio and displaying the compressed first image on the display unit. Moreover, the processing unit transmits the first compression ratio to the server through the receiving/transmitting unit to make the server compress the second image at the first compression ratio and transmit the second image to the receiving/transmitting unit.

According to another embodiment of the invention, the image processing apparatus includes a receiving/transmitting unit, a time recording unit and a processing unit. The receiving/transmitting unit is capable of communicating with the server so as to receive the first image and the second image. The time recording unit is coupled to the receiving/transmitting unit and is for recording a browse time, wherein the browse time is the period from the image processing apparatus completes receiving the first image to the image processing apparatus decides to receive the second image. The processing unit is coupled to the receiving/transmitting unit and the time recording unit, for calculating a first compression ratio according to the browse time and the initial compression ratio. Moreover, the processing unit transmits the first compression ratio to the server through the receiving/transmitting unit to make the server compress the second image at the first compression ratio and transmit the second image to the receiving/transmitting unit.

According to another embodiment of the invention, the image processing apparatus includes a receiving/transmitting unit, a time recording unit and a processing unit. The receiving/transmitting unit is capable of communicating with the server so as to receive the first image and the second image. The time recording unit is coupled to the receiving/transmitting unit and is for recording a browse time, wherein the browse time is the period from the image processing apparatus decides to receive the first image to the image processing apparatus decides to receive the second image. The processing unit is coupled to the receiving/transmitting unit and the time recording unit, for calculating a first compression ratio according to the browse time and the initial compression ratio. Moreover, the processing unit transmits the first compression ratio to the server through the receiving/transmitting unit to make the server compress the second image at the first compression ratio and transmit the second image to the receiving/transmitting unit.

Another aspect of the invention is to provide an image processing method. According to an embodiment of the invention, the image processing method includes the following steps. Firstly, a first image compressed at an initial compression ratio from a server is received. Secondly, the first image is received and selectively compressed at a first compression ratio. Subsequently, the first image compressed at the first compression ratio is displayed. After that, the first compression ratio is transmitted. Moreover, a second image is received from the server, wherein the second image is compressed at the first compression ratio.

The objective of the present invention will no doubt become obvious to those of ordinary skill in the art after reading the following detailed description of the preferred embodiment, which is illustrated in the various figures and drawings.

DETAILED DESCRIPTION OF THE INVENTION

Figure 1A:
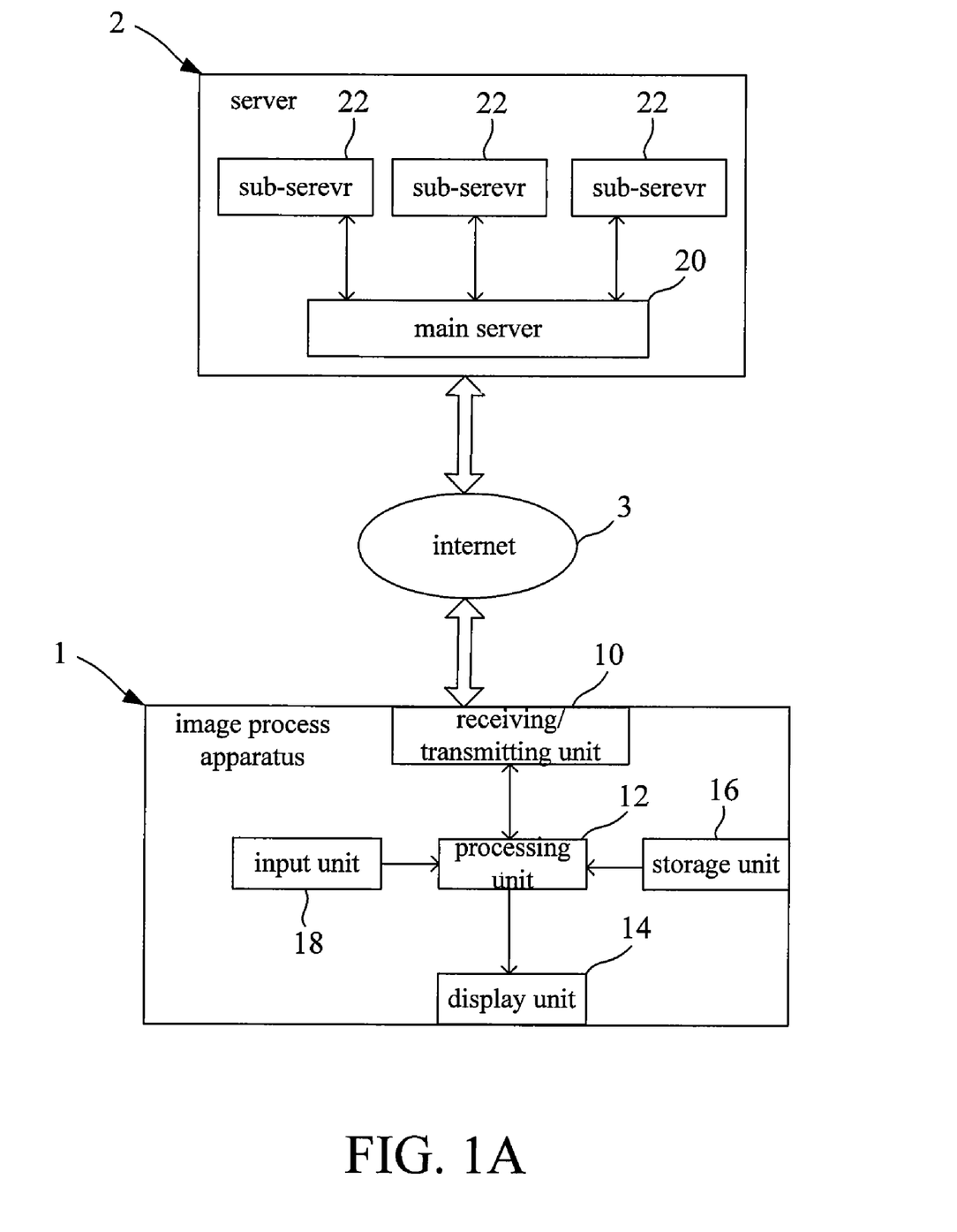
FIG. 1A is a functional block diagram illustrating an image processing apparatus and a server according to an embodiment of the invention.
Figure 1B:
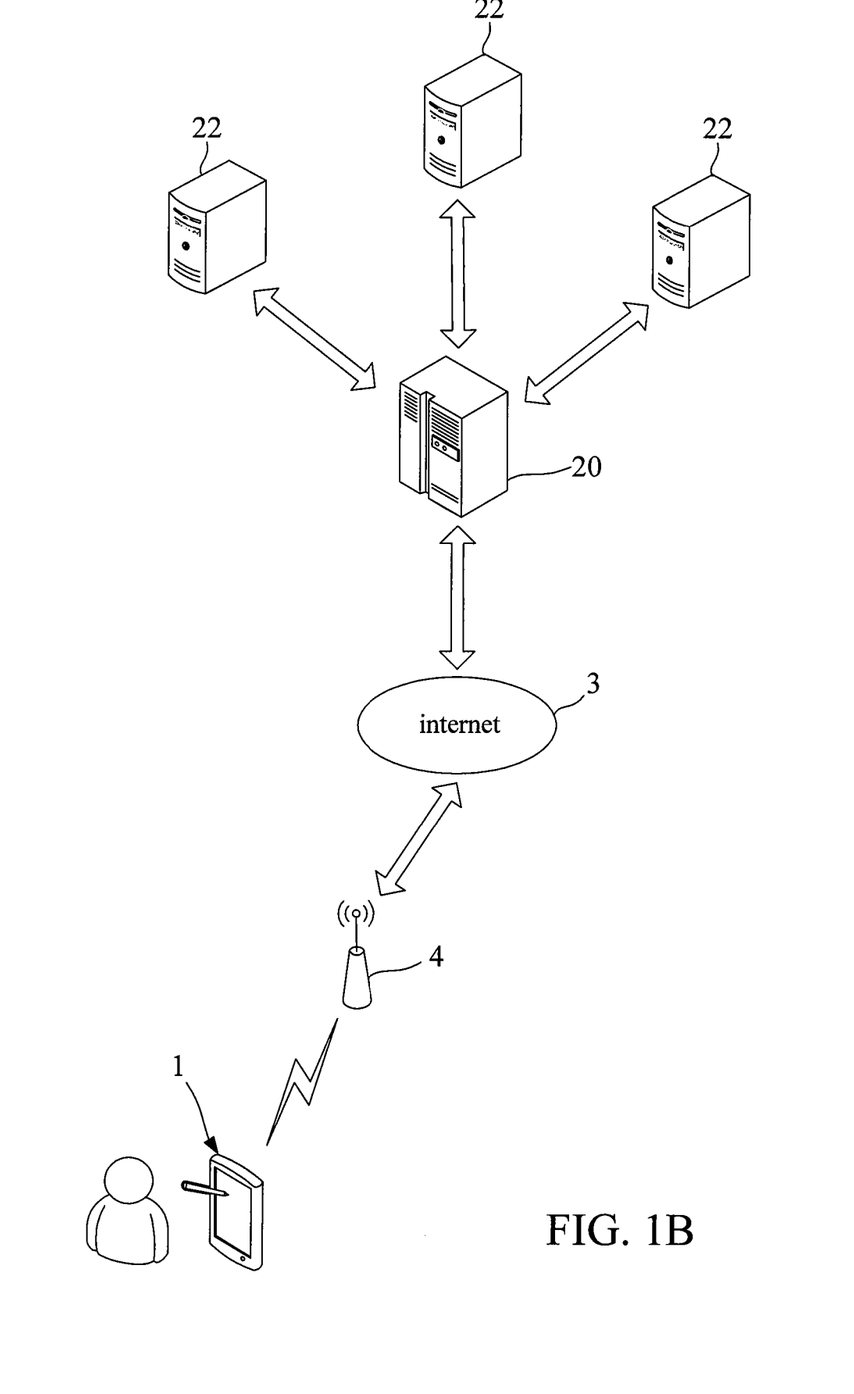
FIG. 1B illustrates the hardware of the image processing apparatus and the server according to an embodiment of the invention.

Please refer to FIG. 1A and FIG. 1B. FIG. 1A is a functional block diagram illustrating the image processing apparatus 1 and the server 2 according to an embodiment of the invention. FIG. 1B illustrates the image processing apparatus 1 and the hardware of the server 2 according to an embodiment of the invention. In practical applications, the image processing apparatus 1 could be an electronic apparatus provided with a display panel and network functions, such as a mobile phone, a PDA, a multimedia broadcaster or digital photo frame, etc.

As illustrated in FIG. 1A, the server 2 could include a main server 20 and plural sub-servers 22. The plural sub-servers 22 are used to provide various kinds of network resources such as news, maps, albums and e-mails, etc. If a client subscribes for the network resources mentioned above by means of the image processing apparatus 1, the main server 20 could download the required network resources from the plural sub-servers 22, transfer the data thereof into images, and transmit the images to the image processing apparatus 1 by means of the internet 3.

In practical applications, the image processing apparatus 1 could connect with server 2 by means of wired internet or wireless internet. For example, as illustrated in FIG. 1B, the image processing apparatus 1 could connect to a wireless access point 4 and further connect to the server by means of the internet 3.

After a client subscribes a specific type of network resources (e.g. news data), the server 2 would transmit a first image of the news data to the image processing apparatus 1, wherein the server 2 could firstly compress the first image at an initial compression ratio. For example, the server 2 could compress the first image at the lowest compression ratio and transmit it to the image processing apparatus 1. The lowest compression ratio could make the first image have the best image quality, but on the contrary the file size of the image will be the largest.

As illustrated in FIG. 1A, the image processing apparatus 1 includes a receiving/transmitting unit 10, a processing unit 12, a display unit 14, a storage unit 16 and an input unit 18. The processing unit 12 is coupled to the receiving/transmitting unit 10, the display unit 14, the storage unit 16 and the input unit 18 respectively. The receiving/transmitting unit 10 is capable of communicating with the server 2 so as to receive the first image.

After the receiving/transmitting unit 10 receives the first image, the first image could be displayed on the display unit 14. According to the resolution of the display unit 14 and the client's requirement (e.g. the quality of the image or the transmission time of the image), the processing unit 12 could selectively compress the first image at a first compression ratio and display the compressed first image on the display unit 14 again. Basically, the higher compression ratio could make the first image have a smaller file size and a worse image quality, but on the contrary the transmission time will be shorter.

In practical applications, the storage unit 16 therein stores plural different default first compression ratios. In an embodiment, when the processing unit 12 receives a first signal, the processing unit 12 could transmit the first compression ratio to the server 2 through the receiving/transmitting unit 10 to make the server 2 compress the second image (e.g. news data) at the first compression ratio and transmit the second image to the receiving/transmitting unit 10, wherein the first compression ratio is one of the default first compression ratios. Particularly, the first signal is an instruction representing the client's agreement with compressing the first image at the first compression ratio.

When the processing unit 12 receives a second signal, the processing unit 12 could recompress the first image at a second compression ratio and display the compressed first image on the display unit 14, wherein the second compression ratio is one of the default first compression ratios. Particularly, the second signal is an instruction representing the client's disagreement with compressing the first image at the first compression ratio.

In another embodiment, the processing unit 12 could compress the first image at the default first compression ratios respectively according to a selection procedure, and display the compressed first image on the display unit 14 respectively. In practical applications, the selection procedure is a sequential selection procedure or a binary selection procedure.

Otherwise, the processing unit 12 could display the default first compression ratios on the display unit 14 according to a selection procedure for a client to select. For example, by means of the sequential selection procedure, the first image could be compressed from the highest to the lowest default first compression ratio in turn and displayed on the display unit 14. And, by means of the binary selection procedure, the first image could be compressed at the intermediate one of the default first compression ratios and then be displayed. After that, the first image is compressed at an intermediate first compression ratio selected from the remaining higher first compression ratios and then be displayed, or the first image could be compressed at an intermediate first compression ratio selected from the remaining lower first compression ratios and then be displayed.

Subsequently, depending on the client's requirement, an appropriate first compression ratio is selected from the default second compression ratios by means of the input unit 18 (e.g. a key switch or a touch device). According to the selected first compression ratio, the input unit 18 could generate a corresponding selective signal for the processing unit 12, to make the processing unit 12 select the first compression ratio from the default first compression ratios according to the selective signal. After that, the processing unit 12 transmits the determined first compression ratio to the server 2 through the receiving/transmitting unit 10 to request the server 2 to compress the second image at the first compression ratio and transmit the second image to the receiving/transmitting unit 10.

Moreover, the processing unit 12 could further calculate the transmission time of the second image according to the first compression ratio and the transmission time of the first image. Because the image processing apparatus 1 could record the network bandwidth and the connection speed, and the first image and the second image are processed by the same data format (namely, the original file size of them are substantially the same), the processing unit 12 could calculate the transmission time of the second image according to the variable quantity of the file size (namely, the value of the first compression ratio).

According to the client's requirement, the client could observe the qualities of the first images after being compressed at different compression ratios and their transmission time through the display unit 14 and determine the first compression ratio if it meets the client's requirement. Particularly, the first image and the second image mentioned above are made of the news data and are regarded as an embodiment. Depending on different types of network resources, the client could always set up the first compression ratio by means of the image processing apparatus 1 and transmit the first compression ratio to the server 2. Therefore, the image processing apparatus 1 of the invention could improve the transmission efficiency in accordance with the display unit with different sizes or different network resources provided by different servers 2.

Figure 2:
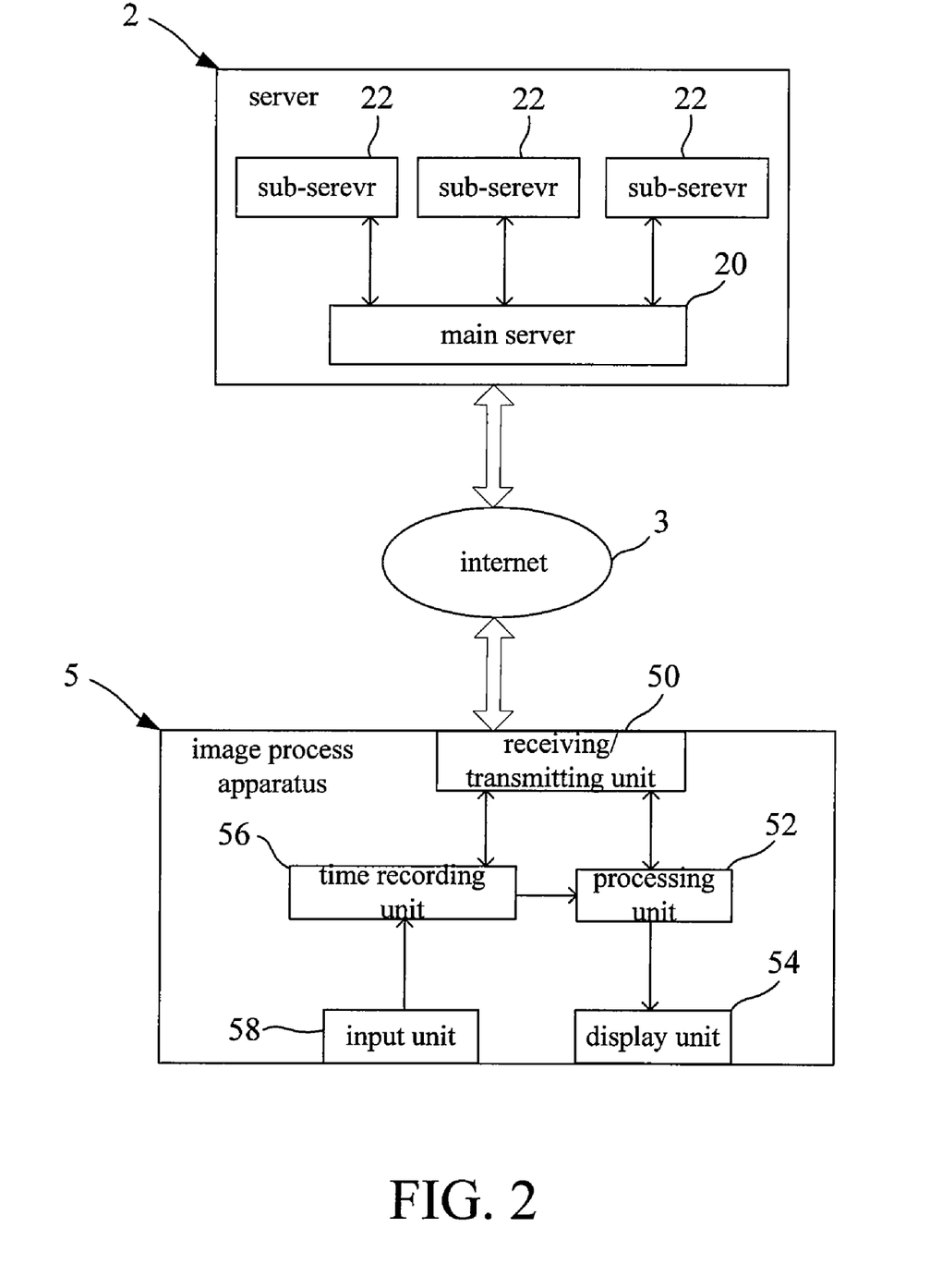
FIG. 2 is a functional block diagram illustrating the image processing apparatus according to another embodiment of the invention.

Please refer to FIG. 2. FIG. 2 is a functional block illustrating the image processing apparatus 5 according to another embodiment of the invention.

As illustrated in FIG. 2, the image processing apparatus 5 includes a receiving/transmitting unit 50, a processing unit 52, a display unit 54, a time recording unit 56 and an input unit 58. The processing unit 52 is coupled to the receiving/transmitting unit 50, the display unit 54 and the time recording unit 56. The time recording unit 56 is coupled to the receiving/transmitting unit 50 and the input unit 58. The server 2 could transmit a first image and a second image, and the server 2 compresses the first image at an initial compression ratio at first. The receiving/transmitting unit 50 is capable of communicating with the server 2 so as to receive the first image and the second image. The time recording unit 56 is for recording a browse time.

Figure 3A:
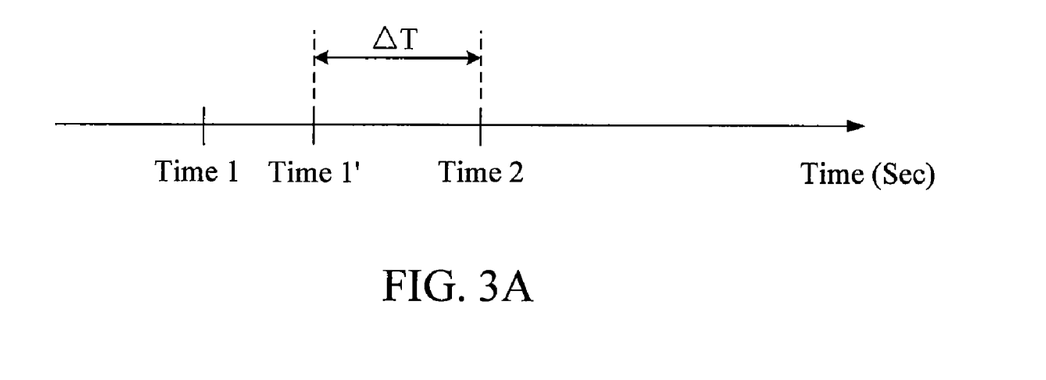
FIG. 3A is a timing diagram of the browse time according to an embodiment of the invention.

Please refer to FIG. 3A. FIG. 3A is a timing diagram of the browse time according to an embodiment of the invention. Time1 is the time when the image processing apparatus 5 decides to receive the first image. Time2 is the time when the image processing apparatus 5 decides to receive the second image. Time1' is the time when the image processing apparatus 5 completes receiving the first image. Particularly, the client can generate a trigger signal at Time1 and Time2 by means of the input unit 58, so as to make the receiving/transmitting unit 50 start to receive the first image and the second image.

When the receiving/transmitting unit 50 completes receiving the first image, the time recording unit 56 could record Time1'; once the receiving/transmitting unit 50 starts to receive the second image, the time recording unit 56 could record Time2 according to the trigger signal, so as to obtain the browse time $\Delta T$. As illustrated in FIG. 3A, the time interval between Time1' and Time2 is defined as the browse time $\Delta T$. That is to say, the browse time $\Delta T$ is the period from the image processing apparatus 5 completes receiving the first image to the image processing apparatus 5 decides to receive the second image.

Afterwards, the processing unit 52 calculates a first compression ratio based on a specific formula according to the browse time and the initial compression ratio. Moreover, the processing unit 52 could transmit the first compression ratio to the server 2 through the receiving/transmitting unit 50 to make the server 2 compress the second image at the first compression ratio and transmit the second image to the receiving/transmitting unit 50.

The length of the browse time could determine the first compression ratio and the quality of the second image. Basically, a short browse time could indicate the client does not need high quality image. Thus, if the browse time is shorter, the processing unit 52 could figure out a higher second compression ratio; if the browse time is longer, the processing unit 52 could figure out a lower second compression ratio. Briefly, the image processing apparatus 5 of the invention could compress an image dynamically at different compression ratios according to the client's browse time and then transmit the image.

Figure 3B:
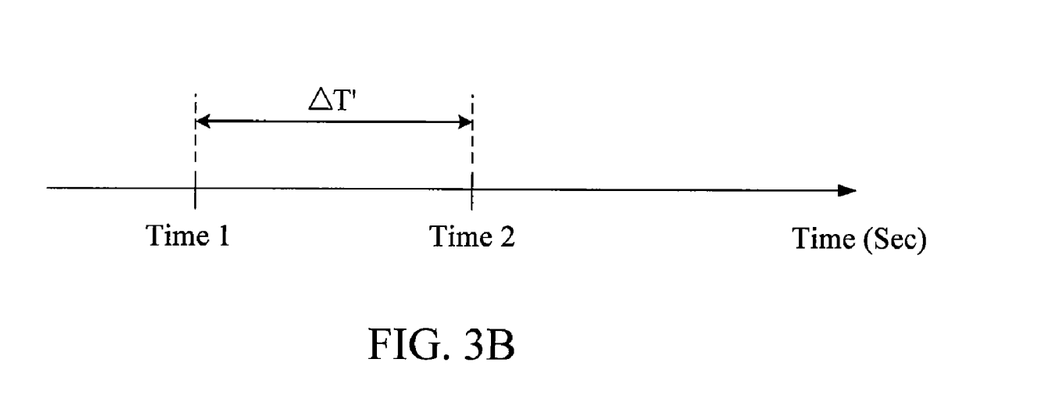
FIG. 3B is a timing diagram of the browse time according to another embodiment of the invention.

Please refer to FIG. 3B. FIG. 3B is a timing diagram of the browse time according to another embodiment of the invention. Time1 is the time when the image processing apparatus 5 decides to receive the first image. Time2 is the time when the image processing apparatus 5 decides to receive the second image. Particularly, the client can generate a first trigger signal and a second trigger signal at Time1 and Time2 by means of the input unit 58, so as to make the receiving/transmitting unit 50 start to receive the first image and the second image.

Furthermore, the time recording unit 56 could record the browse time according to the first trigger signal and the second trigger signal. In the embodiment, the time interval between Time1 and Time2 is defined as the browse time $\Delta T$, as illustrated in FIG. 3B. In the other words, the browse time $\Delta T'$ is the period from the image processing apparatus 5 decides to receive the first image to the image processing apparatus 5 decides to receive the second image.

Furthermore, after the image processing apparatus 5 decides to receive the second image, the processing unit 52, after a default time, transmits a default compression ratio to the server 2 through the receiving/transmitting unit 50 and requests the server 2 to compress the second image at the default compression ratio and retransmit the second image to the receiving/transmitting unit 50. Please notice that the default compression ratio is lower than the original determined first compression ratio, so as to retransmit a second image with higher quality from the server 2 to the image processing apparatus 5. That is to say, when it reaches the default time, the client is expected to carefully browse the second image in the design, and then the server 2 is requested to retransmit the second image with higher quality for the client to browse.

Figure 4A:
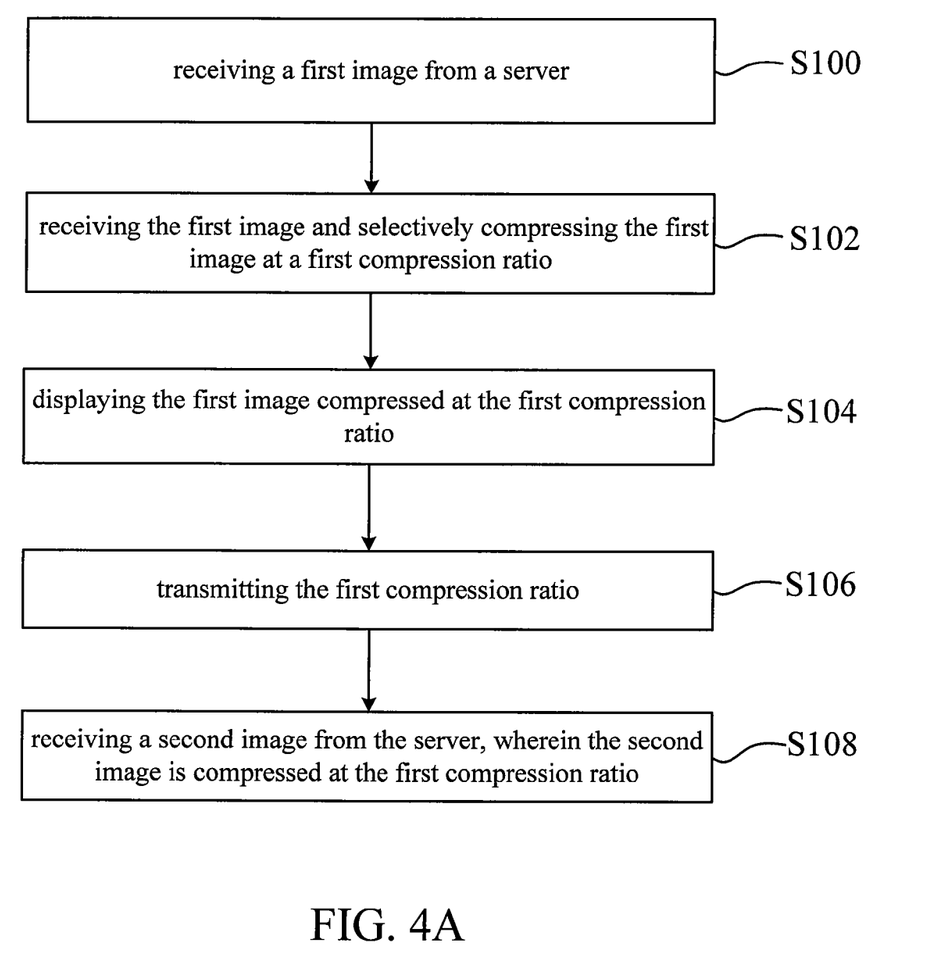
FIG. 4A is a flow chart demonstrating an image processing method according to an embodiment of the invention.

Please refer to FIG. 4A. FIG. 4A is a flow chart demonstrating an image processing method according to an embodiment of the invention. The image processing method could be applied to a server and an electronic apparatus provided with a display panel and a network function. Moreover, a client could subscribe the network resources they need by means of the electronic apparatus.

Firstly, step S100 is executed to receive a first image from a server. Please notice that the first image in the step S100 is compressed at an initial compression ratio at the server in the beginning.

Subsequently, step S102 is executed to receive the first image by an electronic apparatus and selectively compress the first image at a first compression ratio. In practical applications, the electronic apparatus therein could store a plurality of default first compression ratios with different compression ratios.

Figure 4B:
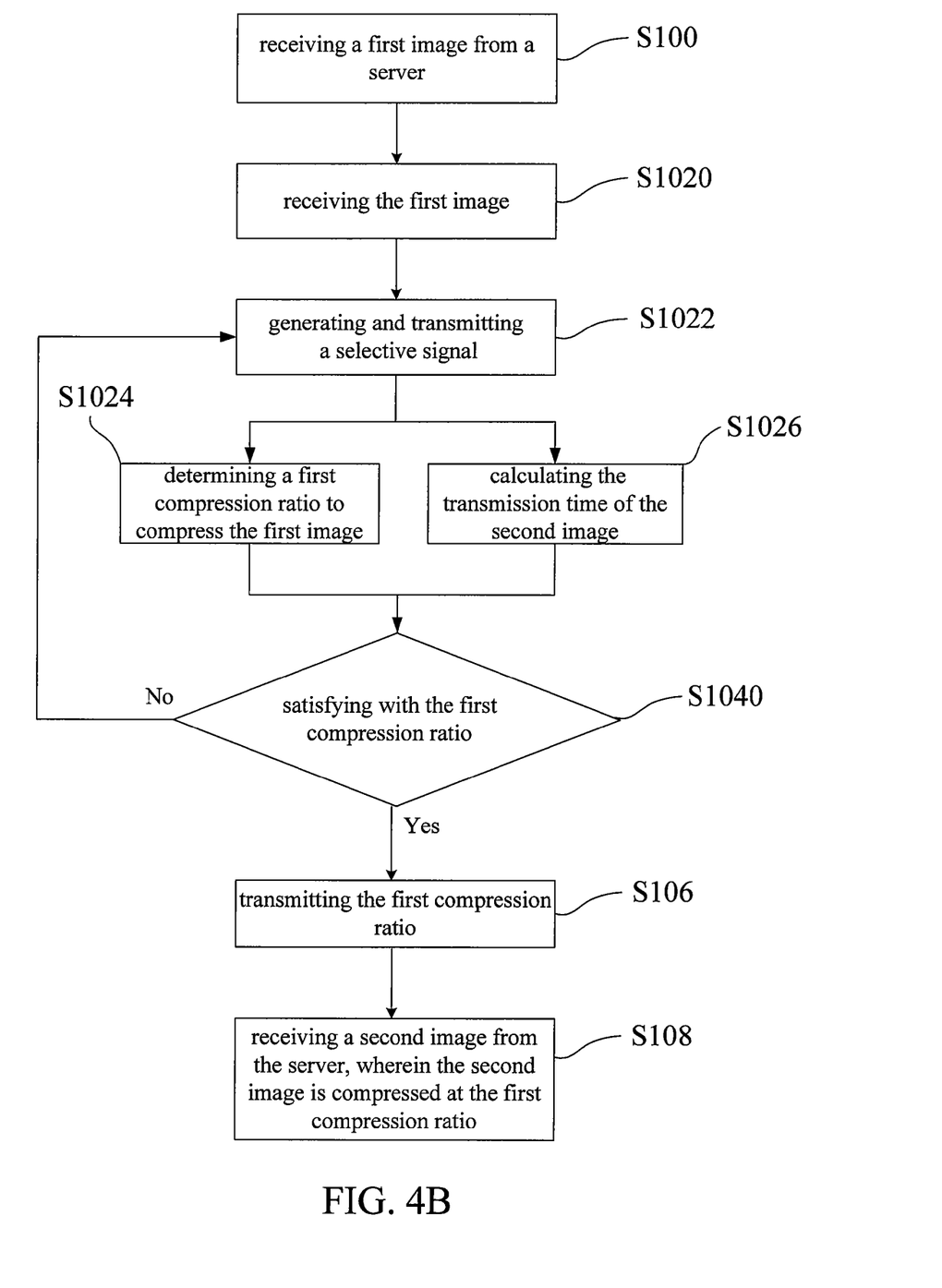
FIG. 4B is an extended flow chart of FIG. 4A demonstrating the image processing method.

Please refer to FIG. 4B. FIG. 4B is an extended flow chart of FIG. 4A demonstrating the image processing method.

In step S1020, a first image is received. Later, in step S1022, the client could generate a selective signal by means of the electronic apparatus and transmit it. After that, in step S1024, the first compression ratio is selected from the plural default first compression ratios according to the selective signal to compress the first image.

In an embodiment, if the client is satisfied with the compressed first image, a first signal could be generated by means of the electronic apparatus. If the client is unsatisfied with the compressed first image, a second signal could be generated by means of the electronic apparatus, and then the electronic apparatus compresses the first image at a second compression ratio and displays the compressed first image, wherein the second compression ratio is one of the default first compression ratios. In another embodiment, the electronic apparatus could compress the first image at the default first compression ratios respectively according to a selection procedure, and display the compressed first image on the display unit respectively for the client to select.

In step S1026, the transmission time of the second image is calculated according to the first compression ratio and the transmission time of the first image. The first image and the second image could be processed by the same data format.

Subsequently, in step S1040, the client could obtain the resolution of the image and the transmission time of the second image, and confirm if he/she is satisfied with the first compression ratio. If the client is not satisfied, then the step S1022 is re-executed; if satisfied, the step S106 is executed to transmit the first compression ratio to the server from the electronic apparatus. After that, step S108 is executed to receive a second image from the server, wherein the second image is compressed at the first compression ratio.

Figure 5:
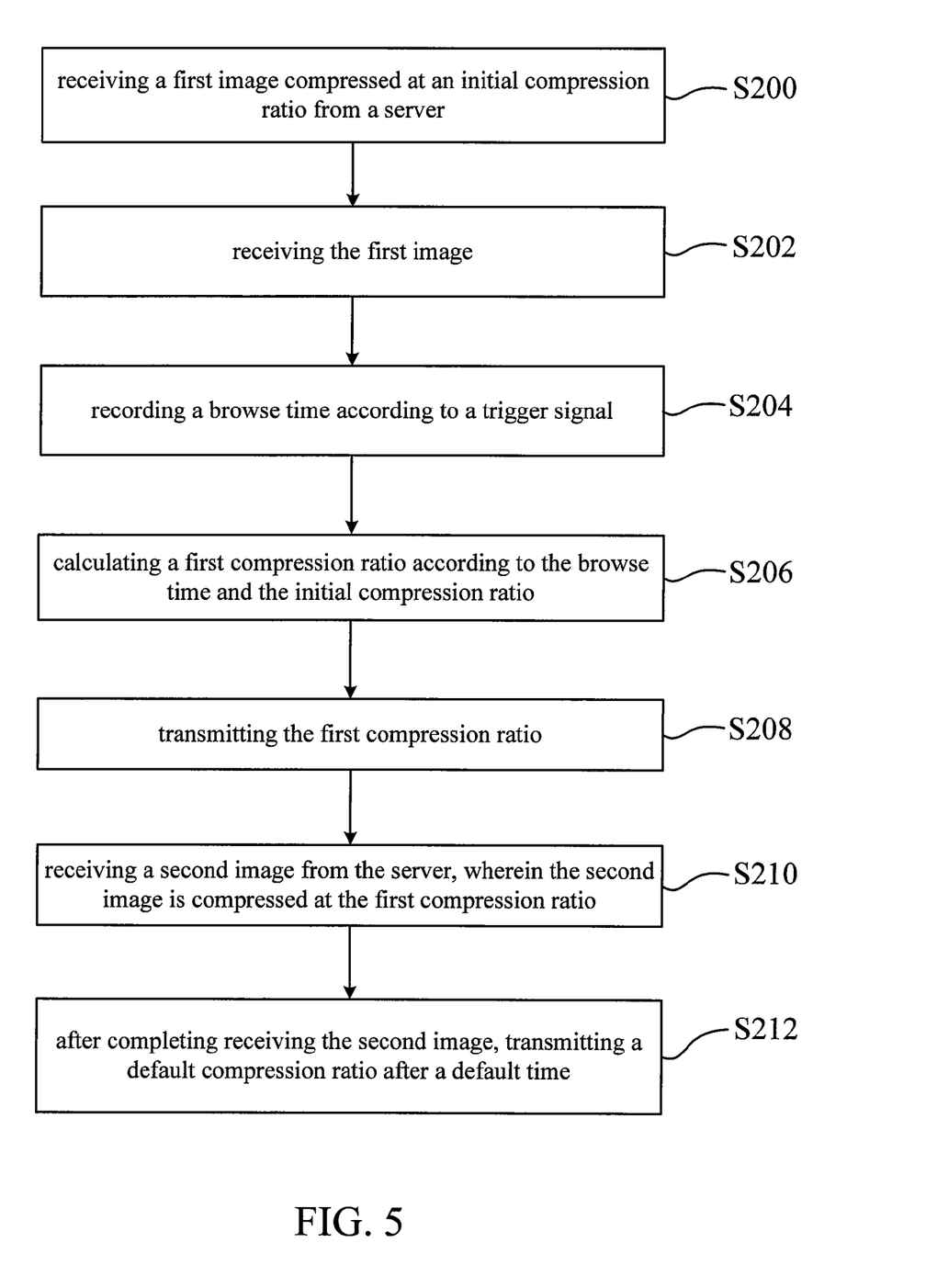
FIG. 5 is a flow chart demonstrating another image processing method according to an embodiment of the invention.

Please refer to FIG. 5. FIG. 5 is a flow chart demonstrating another image processing method according to an embodiment of the invention.

Firstly, step S200 is executed to receive a first image from a server. Please notice that the first image in the step S200 is compressed at an initial compression ratio at the server in the beginning Subsequently, step S202 is executed to receive the first image by an electronic apparatus. After that, step S204 is executed to record a browse time by an electronic apparatus according to a trigger signal. The definition and the method for recording are as illustrated in FIG. 3A and FIG. 3B, so the details are not described again here.

Next, step S206 is executed to calculate a first compression ratio by the electronic apparatus according to the browse time and the initial compression ratio.

Subsequently, step S208 is executed to transmit the first compression ratio to the server by the electronic apparatus.

Afterwards, step S210 is executed to receive a second image from the server to the electronic apparatus, wherein the second image is compressed at the first compression ratio.

Furthermore, step S212 is executed after the electronic apparatus completes receiving the second image, to transmit a default compression ratio from the electronic apparatus to the server after a default time to request the server to re-compress the second image at the default compression ratio and re-transmit the second image to the electronic apparatus. Please notice that the default compression ratio is lower the predetermined first compression ratio, so that the server could retransmit a second image with a higher quality for the client to browse.

To summarize, the image processing apparatus and the image processing method of the invention could suit clients' requirement, such as the quality or the transmission time of the image to select an optimized image compression ratio. On the other hand, while clients are browsing the network resources, the invention could further adjust the image compression ratio dynamically according to clients' browse time.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing apparatus, for communicating with a server capable of transmitting a first image and a second image, the server compressing the first image at an initial compression ratio, and the image processing apparatus comprising:
    a receiving/transmitting unit, for communicating with the server so as to receive the first image and the second image;
    a time recording unit, coupled to the receiving/transmitting unit, for recording a browse time; and
    a processing unit, coupled to the receiving/transmitting unit and the time recording unit, for calculating a first compression ratio according to the browse time and the initial compression ratio, the processing unit transmitting the first compression ratio to the server through the receiving/transmitting unit to make the server compress the second image at the first compression ratio and transmit the second image to the receiving/transmitting unit.

2. The image processing apparatus of claim 1, wherein the initial compression ratio is different from the first compression ratio.

3. The image processing apparatus of claim 1, further comprising:
    an input unit, coupled to the time recording unit, for generating a trigger signal according to a user's determination, the time recording unit recording the browse time according to the trigger signal generated by the input unit, wherein the browse time is the period from the image processing apparatus completes receiving the first image to the image processing apparatus decides to receive the second image.

4. The image processing apparatus of claim 1, further comprising:
    an input unit, coupled to the time recording unit, for generating a first trigger signal of deciding to receive the first image and a second trigger signal of deciding to receive the second image according to a user's determination, the time recording unit recording the browse time according to the first trigger signal and the second trigger signal, wherein the browse time is the period from the image processing apparatus decides to receive the first image to the image processing apparatus decides to receive the second image.

5. The image processing apparatus of claim 1, wherein after the image processing apparatus completes receiving the second image, the processing unit, after a default time, transmits a default compression ratio to the server through the receiving/transmitting unit and requests the server to compress the second image at the default compression ratio and re-transmit the second image to the receiving/transmitting unit.

* * * * *